(12) United States Patent
Schall et al.

(10) Patent No.: US 10,777,958 B2
(45) Date of Patent: Sep. 15, 2020

(54) BEAM REVERSER MODULE AND OPTICAL POWER AMPLIFIER HAVING SUCH A BEAM REVERSER MODULE

(71) Applicant: Carl Zeiss SMT GmbH, Oberkochen (DE)

(72) Inventors: Michael Schall, Essingen (DE); Johannes Kraus, Theilheim (DE); Holger Muenz, Aalen (DE); Ingrid Schuster, Oberkochen (DE); Willi Anderl, Huettlingen (DE); Ulrich Weber, Ulm (DE); Markus Bauer, Oberkochen (DE); Jeffrey Erxmeyer, Oberkochen (DE); Michel Le Maire, Oberkochen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 325 days.

(21) Appl. No.: 15/830,373

(22) Filed: Dec. 4, 2017

(65) Prior Publication Data

US 2018/0102620 A1  Apr. 12, 2018

Related U.S. Application Data

(60) Division of application No. 14/816,217, filed on Aug. 3, 2015, now Pat. No. 9,843,153, which is a
(Continued)

(51) Int. Cl.
*H01S 3/00* (2006.01)
*G02B 5/08* (2006.01)
(Continued)

(52) U.S. Cl.
CPC .............. *H01S 3/0071* (2013.01); *G02B 5/04* (2013.01); *G02B 5/08* (2013.01); *G02B 5/12* (2013.01);
(Continued)

(58) Field of Classification Search
CPC .. H01S 3/10023; H01S 3/2333; H01S 3/0071; G02B 7/1815; G02B 5/04
See application file for complete search history.

(56) References Cited

U.S. PATENT DOCUMENTS

| 3,633,126 A | 1/1972 | Martin |
| 4,156,852 A | 5/1979 | Hagen |

(Continued)

FOREIGN PATENT DOCUMENTS

| DE | 102005016200 A1 | 9/2005 |
| JP | 2000-124534 | 4/2000 |

(Continued)

OTHER PUBLICATIONS

Burke, Image Acquisition: Handbook of machine vision engineering: vol. 1, entry "prism expander", p. 418, (1996).*

(Continued)

*Primary Examiner* — Eric L Bolda
(74) *Attorney, Agent, or Firm* — Fish & Richardson P.C.

(57) ABSTRACT

A beam reverser module for an optical power amplifier of a laser arrangement comprises at least one reflecting surface for receiving an incoming laser beam propagating in a first direction and reflecting the incoming laser beam into a second direction different from the first direction, wherein the at least one reflecting surface is a highly reflecting surface of at least one mirror.

18 Claims, 5 Drawing Sheets

Related U.S. Application Data continuation of application No. PCT/EP2013/052574, filed on Feb. 8, 2013.

(51) Int. Cl.
  *G02B 7/18* (2006.01)
  *G02B 5/04* (2006.01)
  *G02B 5/12* (2006.01)
  *H01S 3/225* (2006.01)
  *H01S 3/10* (2006.01)
  *H01S 3/23* (2006.01)

(52) U.S. Cl.
  CPC ........ *G02B 7/1815* (2013.01); *H01S 3/10023* (2013.01); *H01S 3/2251* (2013.01); *H01S 3/2256* (2013.01); *H01S 3/2333* (2013.01); *H01S 3/005* (2013.01); *H01S 3/225* (2013.01)

(56) References Cited

U.S. PATENT DOCUMENTS

| | | | | |
|---|---|---|---|---|
| 4,525,034 | A * | 6/1985 | Simmons | G02B 5/3066 359/485.02 |
| 5,052,815 | A | 10/1991 | Nightingale | |
| 6,021,154 | A | 2/2000 | Unternahrer | |
| 6,317,449 | B1 | 11/2001 | Zanger et al. | |
| 6,433,921 | B1 | 8/2002 | Wu | |
| 6,433,922 | B1 | 8/2002 | Ghera | |
| 7,068,689 | B2 | 6/2006 | Liu | |
| 8,014,432 | B2 | 9/2011 | Ye et al. | |
| 8,284,815 | B2 | 10/2012 | Ye | |
| 8,817,831 | B1 * | 8/2014 | Terraciano | H01S 3/0092 372/100 |
| 9,843,153 | B2 | 12/2017 | Schall et al. | |
| 2001/0053017 | A1 * | 12/2001 | Oyama | G02B 1/02 359/350 |
| 2002/0191654 | A1 * | 12/2002 | Klene | G03F 7/70025 372/25 |
| 2003/0099262 | A1 | 5/2003 | Masuda | |
| 2003/0227956 | A1 | 12/2003 | Scaggs | |
| 2004/0071179 | A1 | 4/2004 | Zanger et al. | |
| 2006/0023277 | A1 | 2/2006 | Clar | |
| 2008/0117948 | A1 | 5/2008 | Wakabayashi | |
| 2008/0144671 | A1 | 6/2008 | Ershov et al. | |
| 2008/0291947 | A1 | 11/2008 | Veitch | |
| 2010/0098120 | A1 | 4/2010 | Ye et al. | |
| 2011/0013265 | A1 | 1/2011 | Nishimura | |
| 2012/0155503 | A1 | 6/2012 | Vetrovec | |
| 2012/0307257 | A1 | 12/2012 | Yoshii | |
| 2015/0340829 | A1 | 11/2015 | Schall et al. | |

FOREIGN PATENT DOCUMENTS

| | | |
|---|---|---|
| JP | 2001-326408 | 11/2001 |
| JP | 2002-250784 | 3/2002 |
| JP | 2003-050413 | 2/2003 |
| JP | 2005-524998 | 8/2005 |
| JP | 2009-514246 | 4/2006 |
| JP | 2008-130652 | 6/2008 |
| JP | 2011-166169 | 8/2011 |
| JP | 2012-522376 | 9/2012 |
| WO | WO200101531 A1 | 1/2001 |
| WO | WO 03/096497 A1 | 11/2003 |
| WO | WO2004012308 A2 | 2/2004 |
| WO | WO 2010111119 A1 | 9/2010 |

OTHER PUBLICATIONS

International Search Report and Written Opinion for corresponding PCT Appl No. PCT/EP2013/052574, dated Jan. 8, 2014.
International Preliminary Report on Patentability and Written Opinion for corresponding PCT Appl. No. PCT/EP2013/052574, 10 pages, dated Aug. 20, 2015.
Japanese Office Action and English translation thereof for corresponding JP Appln. No. 2015-556400, dated Nov. 11, 2016, 16 pages.
Japanese Office Action, with translation herein, for corresponding JP Appl No. 2017-096220, dated May 9, 2018.

* cited by examiner

BEAM REVERSER MODULE AND OPTICAL POWER AMPLIFIER HAVING SUCH A BEAM REVERSER MODULE

CROSS-REFERENCE TO RELATED APPLICATIONS

The present application is a divisional of, and claims benefit under 35 USC 120 to, U.S. application Ser. No. 14/816,217, filed Aug. 3, 2015, now U.S. Pat. No. 9,843,153, which is a continuation of, and claims benefit under 35 USC 120 to, international application PCT/EP2013/052574, filed Feb. 8, 2013. The entire disclosure of U.S. application Ser. No. 14/816,217 and international application PCT/EP2013/052574 are incorporated by reference herein.

The invention relates to a beam reverser module for an optical power amplifier of a laser arrangement.

The invention further relates to an optical power amplifier of a laser arrangement, comprising a beam reverser module.

US 2010/0098120 A1 discloses an optical power amplifier of a laser arrangement, in particular an excimer laser. Excimer lasers are a type of electric discharge gas lasers. For high power applications, such lasers have a master oscillator/power amplifier or oscillator configuration, wherein the power oscillator can also be configured or referred to as a power ring amplifier which is also an oscillator. The term "optical power amplifier" used in the present description is to be understood as covering all these configurations.

The laser arrangement according to US 2010/0098120 A1 is used as a light source in semiconductor lithography applications, for example.

One part of the optical power amplifier is the beam reverser module. In US 2010/0098120 A1, the beam reverser module is designed as a prism, having a laser beam entrance surface through which an incoming laser beam enters the prism. The prism further has a first total internal reflection (TIR) surface for receiving the laser beam entering the prism and reflecting the laser beam to a second TIR surface which forms an angle of approximately 90° with the first TIR surface. Finally, the prism has a laser beam exit surface through which the laser beam reflected at the second TIR surface emerges from the prism.

There is a demand to manufacture lasers with an increased output power, in particular if used as light sources in semiconductor lithography applications. However, if the output power of a laser is to be increased, for example from 60 W to 120 W, there is the technical problem that the power amplifier is subject to an increased thermal load caused by increasing absorbed power of the laser beam propagating through the optical elements of the power amplifier.

The increased thermal load on the optical elements of the power amplifier results in an increased heating of some or all optical elements of the power amplifier which causes the so-called thermal lensing. Thermal lensing is an effect induced by temperature gradients in optical elements. These temperature gradients can cause some transverse gradient of the refractive index and/or surface deformations due to laterally inhomogeneous thermal expansion or due to optics bending caused by thermally induced mechanical stresses. Regardless whether the heating of an optical element leads to a gradient of the refractive index or to deformations of optical surfaces, the optical element changes its optical imaging characteristics which can lead to a deviation or distortion of the wavefront of the laser beam, and in the worst case the laser beam can collapse in the laser far field upon changing from low to high duty cycle.

In particular, the beam reverser module according to the optical power amplifier disclosed in US 2010/0098120 A1 is subject to a high thermal load and, accordingly to thermal lensing. For applications at high energy densities, $CaF_2$ surfaces have to be coated for protection against degradation. It has been found that a modification of a bare $CaF_2$-surface by coating affects the absorption of a totally reflected beam significantly stronger than absorption of a beam passing through the surface. So, the inventors found that for TIR the level of absorption is strongly underestimated (at least in case of $CaF_2$), and the thermally induced deformation of the TIR-surfaces under high optical load is one of the most relevant contributors to the total thermal drift of laser beam properties. In addition, the prism of the known beam reverser module is comparatively large and bulky so that the optical propagation path of the laser beam through the prism is comparatively long. The long propagation path coincides with an increased absorption, because the absorption is proportional to the optical propagation path of light through a medium.

It is, therefore, an object of the present invention to provide a beam reverser module for an optical power amplifier of a laser arrangement which at least reduces the thermal lensing occurring in the known beam reverser module, if high power output of the laser is required.

According to a first aspect of the invention, this object is achieved by a beam reverser module for an optical power amplifier of a laser arrangement, comprising at least one reflecting surface for receiving an incoming laser beam propagating in a first direction and reflecting the incoming laser beam into a second direction different from the first direction, wherein the at least one reflecting surface is a highly reflecting surface of a first mirror.

The beam reverser module according to this aspect of the invention does not use a TIR surface for reversing the laser beam, but uses at least one high reflection mirror which substitutes at least one of the TIR surfaces of the known beam reverser module.

The high absorption at the TIR surfaces leads to a large thermal gradient which introduces a thermally induced deformation of the reflecting surface, and accordingly, a wave front deformation of the laser beam. By replacing the TIR surfaces of the known beam reverser module with at least one highly reflecting mirror, thermal lensing can be reduced.

In a preferred refinement, the beam reverser module further comprises a downstream beam deflecting element arranged downstream of the at least one reflecting surface, which deflects the laser beam reflected at the at least one reflecting surface into a third direction different from the first and the second directions such that the laser beam deflected at the beam deflecting element intersects the laser beam propagating in the first direction.

By virtue of the downstream beam deflecting element, the same optical functionality as in case of the known beams reverser module can be obtained, but with less risk of thermal lensing than in case of the known beam reverser module.

In the context of the afore-mentioned refinement, it is further preferred if the downstream beam deflecting element is a transmitting optical element having an entrance surface and an exit surface, the transmitting optical element being arranged with respect to the laser beam reflected at the at least one reflecting surface such that the laser beam propagates through the transmitting optical element from the entrance surface to the exit surface without total internal reflection.

This refinement is in accordance with the inventive idea to avoid TIR surfaces in the beam reverser module as far as possible, preferably completely, in order to avoid or at least reduce thermal lensing in the beam reverser module.

Further in the context with the afore-mentioned refinement, the entrance surface and/or the exit surface is/are coated with an anti-reflective coating.

The anti-reflective coating reduces laser light losses due to reflection at the entrance surface and/or exit surface of the transmitting beam deflecting element.

In a further preferred refinement, the downstream beam deflecting element is a prism.

This refinement has the advantage of a simple design with respect to manufacturing of the beam deflecting element.

In a further preferred refinement, the beam reverser module further comprises an upstream beam deflecting element arranged upstream of the at least one reflecting surface, which deflects the incoming beam into the first direction.

The upstream beam deflecting element can be used instead of or in addition to the down stream beam deflecting element.

As in the case of the downstream beam deflecting element, the upstream beam deflecting element preferably is a transmitting optical element having an entrance surface and an exit surface, the transmitting optical element being arranged with respect to the incoming laser beam such that the laser beam propagates through the transmitting optical element from the entrance surface to the exit surface without total internal reflection.

Further, the entrance surface and/or the exit surface of the transmitting optical element of the upstream beam deflecting element is/are coated with an anti-reflective coating.

The upstream beam deflecting element preferably is a prism.

In a further preferred refinement, the upstream beam deflecting element and the downstream beam deflecting element are together embodied as a single monolithic optical element, preferably as a single prism.

This refinement has the advantage that both, the upstream beam deflecting element and the downstream beam deflecting element can be simply manufactured as one single prism.

In a further preferred refinement, the at least one reflecting surface is a first reflecting surface, and the beam reverser module further comprises at least one second reflecting surface receiving the laser beam reflected at the first reflecting surface and reflecting the laser beam into a direction different from the first direction, wherein the at least one second reflective surface is a highly reflective surface of at least one second mirror.

In this refinement, both TIR surfaces of the known beam reverser module are replaced with highly reflecting mirror surfaces, thus further reducing thermal lensing. This refinement further renders it possible to dispense with the downstream beam deflecting element and/or the upstream beam deflecting element, because, as provided in a further preferred refinement, the first and the at least one second reflective surface can be arranged to form an angle with one another which is set such that the laser beam reflected at the at least one second reflective surface intersects the incoming laser beam, as it is the case with the known beam reverser module.

In the context of the afore-mentioned refinement, the first and the at least one second mirror are optically bonded on a base plate which defines the angle the first and the at least one second reflective surface form with one another.

In a further preferred refinement, the afore-mentioned angle is set in a range from about 85° to about 95°, preferably set to about 90°.

Further, it is preferred, if the first mirror and the second mirror are arranged such that the laser beam impinges on the first and the at least one second reflecting surface at an angle of incidence in a range from about 40° to about 50°, preferably at an angle of incidence of about 45°.

According to a second aspect of the invention, the object underlying the invention is achieved by providing a beam reverser module for an optical power amplifier of a laser arrangement, comprising a prism having a laser beam entrance surface through which an incoming laser beam enters the prism, a first TIR surface for receiving the laser beam entering the prism, a second TIR surface for receiving the laser beam reflected at the first TIR surface, the second TIR surface and the first TIR surface forming an angle greater than 60° with one another, and a laser beam exit surface through which the laser beam reflected at the second TIR surface emerges from the prism, wherein the entrance surface is arranged with respect to the incoming laser beam such that the angle of incidence of the incoming laser beam is greater than the Brewster angle so that the laser beam propagates through the prism with an increased beam width.

According to this aspect of the invention, the beam reverser module comprises a prism as it is the case with the known beam reverser module. However, the prism of the known beam reverser module is arranged with respect to the incoming beam such that the angle of incidence is equal to the Brewster angle (according to the wavelength of the laser light), while in the beam reverser module according to this aspect of the invention the angle of incidence is greater than the Brewster angle so that the laser beam propagates through the prism with an increased beam width in comparison with the beam width of the laser light propagating to the prism of the known beam reverser module.

By increasing the internal beam width of the laser beam propagating through the prism, energy densities and the gradients of the thermal load on the TIR surfaces can be reduced, thus reducing the risk of thermal lensing.

Further, it is preferred if the entrance surface and/or the exit surface of the prism is coated with an HLD (High Laser Durability) anti-reflective coating.

In a further preferred refinement, the first and second total internal reflection surfaces have surface protection coatings changing the E-field conditions on these surfaces in a way that minimizes surface absorption.

Another measure to improve the beam reverser module according to this aspect of the invention is to reduce the thickness of the prism in order to reduce the optical propagation path of the laser beam through the prism.

A further refinement of this aspect of the invention provides that the prism is made of $CaF_2$ with a linear laser induced absorption coefficient of less than $0.2 \times 10'$ cm/mJ.

In a further preferred refinement which can be used in connection with the beam reverser module according to the first aspect as well as in connection with the beam reverser module according to the second aspect, the beam reverser module further comprises a purge device adapted to purge at least one of the optical elements of the beam reverser module directly and with a purge rate which varies over the surface of the optical element in accordance with the position of the laser beam on or in this optical element.

This refinement provides a further measure for reducing thermal lensing by reducing thermal gradients on or in optical elements of the beam reverser module. For example, the upstream beam deflecting element and/or the downstream beam deflecting element according to the first aspect of the invention or the beam reverser prism according to the second aspect of the invention are only partially used by the laser beam leading to the above-explained thermal gradients in these optical elements. By purging these optical elements with a purge rate which varies over the surface of the optical element in accordance with the position of the laser beam on or in this optical element, thermal gradients in the optical elements can be reduced. Accordingly, the purge rate is set to be higher at 'hot sites' of the optical element which correspond to portions of the optical element which are traversed by the laser beam, and the purge rate is lower at 'cold sites' of the optical element which correspond to locations which are not traversed by the laser beam or where the intensity of the laser beam is low.

An optical amplifier of a laser arrangement according to the invention comprises a beam reverser module according to the first aspect of the invention or according to the second aspect of the invention and/or according to any of the above-described refinements.

Further features and advantages will become apparent from the following description and the accompanying drawings.

It is to be understood that the features mentioned above and those still to be explained below can be used not only in the given combinations, but also in other combinations or in isolation, without departing from the scope of the invention.

Figure 1:
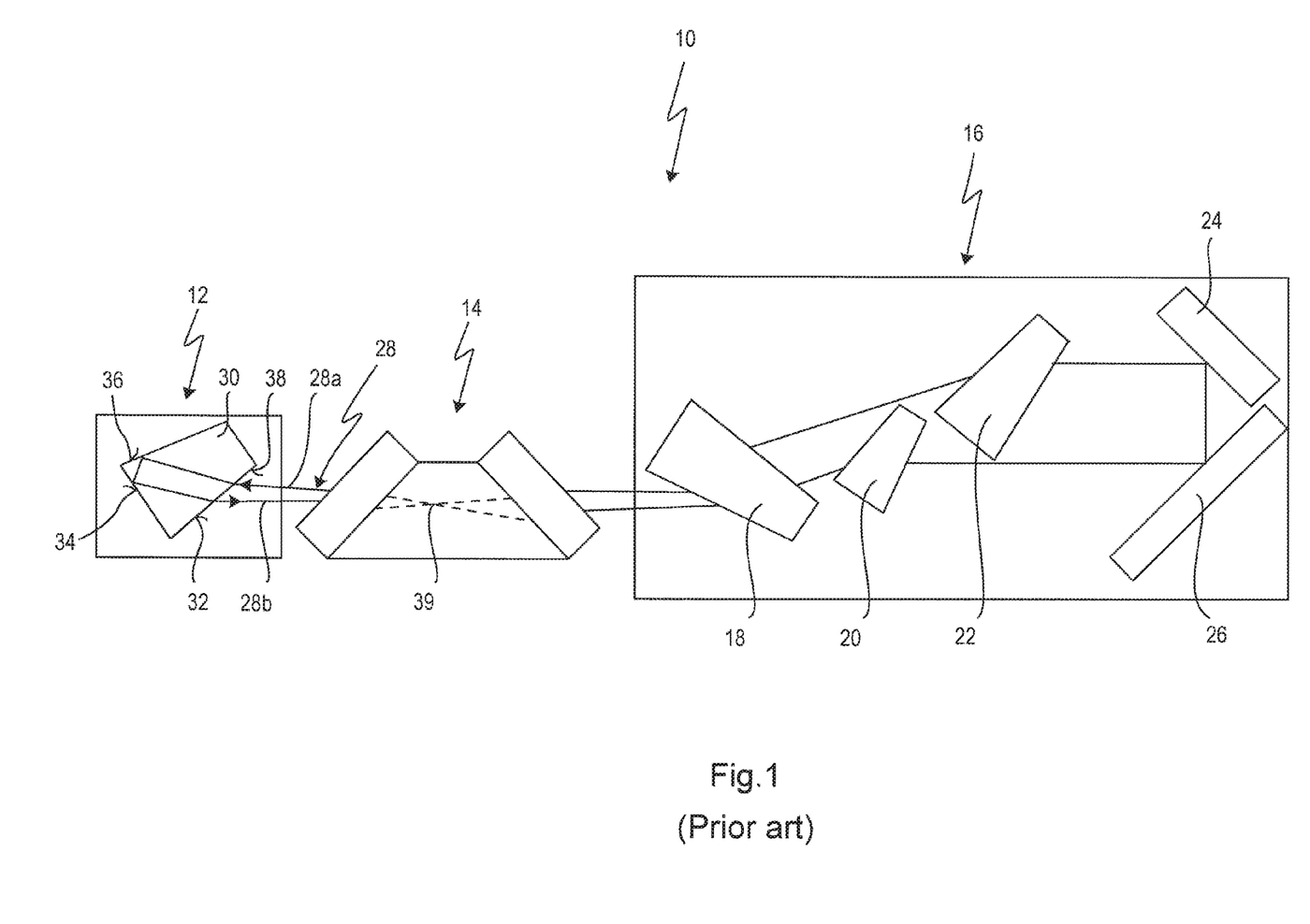
FIG. 1 shows an optical power amplifier as part of a laser arrangement and according the prior art.

Exemplary embodiments of the invention are described below with reference to the accompanying drawings, in which:

FIG. 1 shows an optical power amplifier generally labelled with reference numeral 10 according to the prior art as described in US 2010/0098120 A1 which is hereby incorporated by reference in the present application for further explanations.

The optical power amplifier 10 forms part of a laser arrangement, wherein other parts of the laser arrangement, for example a master oscillator or seed laser are not shown in the drawings.

The optical power amplifier 10 comprises a beam reverser module 12, a power amplifier chamber 14 and an optical unit 16 for laser beam expanding and out-coupling. In more detail, the optical unit 16 comprises three prisms 18, 20, and 22, a folding mirror 24 and an out-coupling mirror 26.

A laser beam 28 which is fed into the optical power amplifier originating from a master oscillator or seed laser (not shown) circulates in the optical power amplifier 10, wherein power amplification occurs in the power amplifier chamber 14 which contains a laser active medium, like a gas, for example ArF or KrF.

The laser beam 28 when circulating in the optical power amplifier 10 is reversed in the beam reverser module 12 which forms one end of the optical power amplifier 10.

The beam reverser module 12 according to US 2010/0098120 A1 comprises a beam reverser prism 30 having a laser beam entrance surface 38 through which the incoming laser beam 28a enters the prism 30, a first total internal reflection (TIR) surface 36 for receiving the laser beam 28 after having entered the prism 30, a second TIR surface 34 for receiving the laser beam 28 reflected at the first TIR surface 36, wherein the first TIR surface 36 and the second TIR surface 34 form an angle of about 90° or slightly less than 90°. The laser beam 28 reflected at the second TIR surface 34 then emerges from a laser beam exit surface 32 which, in the present case, coincides with the laser entrance surface 38. The incoming laser beam 28a and the emerging laser beam 28b intersect at an intersection 39 in the power amplifier chamber 14.

Figure 2:
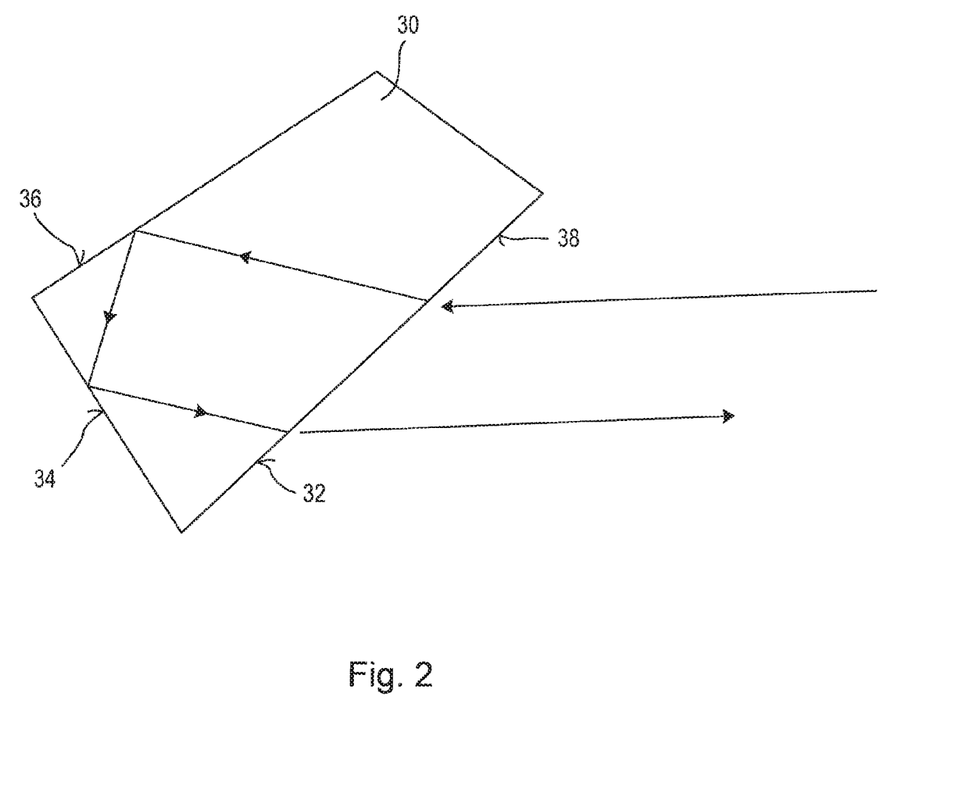
FIG. 2 shows an optical element of a beam reverser module of the optical power amplifier in FIG. 1 in isolation and in enlarged scale with respect to FIG. 1.

FIG. 2 shows the beam reverser prism 30 in isolation and in an enlarged scale.

A metrology set-up has been established to measure the absorption of optical surfaces due to surface coating. This method can detect both, transmissive (bulk) and TIR absorption at an optical surface of laser light on an absorption level <0.01%. When measuring the surface absorption of the beam reverser prism 30 under TIR condition, a significantly higher increase of absorption has been found compared to when measured under transmission. This leads in case of optics working with TIR to a large thermal gradient introducing a thermal lens in the wave front.

In the following, embodiments of beam reverser modules will be described which remedy the detrimental effect of thermal lensing occurring in the known beam reverser prism 30.

The beam reverser modules described below can be used instead of the beam reverser module 12 in the optical power amplifier 10 in FIG. 1, i.e. the beam reverser modules described below are designed such that they have the same optical functionality in terms of beam reversing and directing.

Some of the embodiments of the beam reverser module described below are based on a new design where the beam reverser prism 30 is replaced with other optical elements, and some embodiments of a beam reverser module described below are modifications of the beam reverser prism 30.

Figure 3:
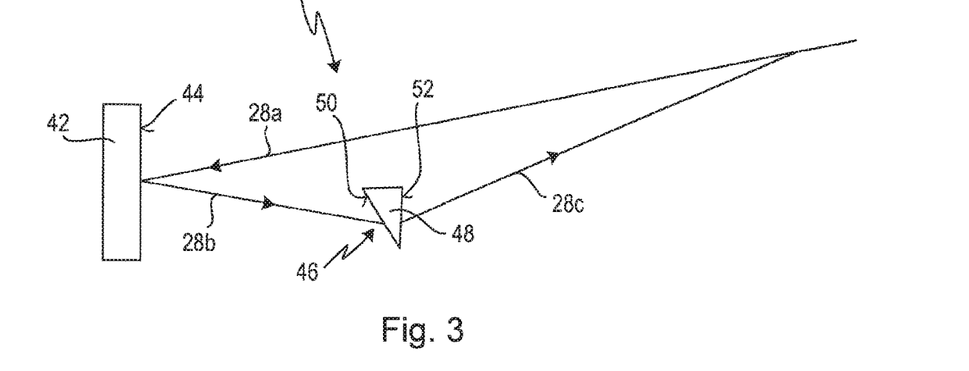
FIG. 3 shows a first embodiment of a beam reverser module for use in the optical power amplifier in FIG. 1 instead of the beam reverser module shown in FIG. 1.

FIG. 3 shows a first embodiment of a beam reverser module 40 where the beam reverser prism 30 in FIG. 1 is replaced by two optical elements. A first optical element is a mirror 42 having a highly reflecting surface 44.

The beam reverser module 40 further comprises a downstream beam deflecting element 46 which is configured as a prism 48.

The incoming light beam 28a which propagates in a first direction is received by the highly reflecting surface 44 of the mirror 42 and reflected at the highly reflecting surface 44 into a second direction according to the reflected laser beam 28b. The reflected laser beam 28b is redirected or deflected by the downstream beam deflecting element 46 into a third direction according to a deflected laser beam 28c. The propagation direction of the deflected laser beam 28c is such that the deflected laser beam 28c intersects the incoming laser beam 28a as shown in FIG. 3 in order to meet the optical functionality shown in FIG. 1 according to which there is a laser beam intersection 39 in the power amplifier chamber 14.

The downstream deflecting element is a transmitting optical element having an entrance surface 50 and an exit surface 52, and as shown in FIG. 3, the down-stream beam deflecting element 46 is arranged with respect to the laser beam 28b reflected at the highly reflecting surface 44 of the mirror 42 such that the laser beam 28b propagates through the prism 48 from the entrance surface 50 to the exit surface 52 without TIR.

With the beam reverser module 40, the TIR surfaces 34 and 36 of the beam reverser prism 30 are dispensed with, so that TIR absorption no longer is an issue. Further, the prism 48 of the downstream beam deflecting element 46 has a small thickness whereby the optical propagation path of the laser beam 28b through the prism 48 is comparatively small so that laser induced absorption is also highly decreased in comparison with the long optical propagation path through the beam reverser prism 30.

Thus, thermal lensing is highly reduced or even avoided when using the beam reverser module 40 instead of the beam reverser module 12 in the optical power amplifier 10 in FIG. 1.

The entrance surface 50 and the exit surface 52 are coated with an anti-reflective coating in order to reduce reflection losses at these surfaces.

Figure 4:
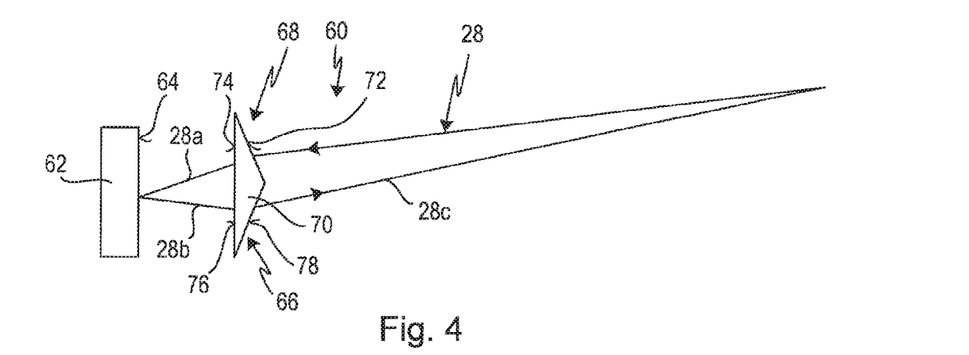
FIG. 4 shows a second embodiment of a beam reverser module for use in the optical power amplifier in FIG. 1 instead of the beam reverser module shown in FIG. 1.

FIG. 4 shows another embodiment of a beam reverser module 60 which is a modification of the beam reverser module 40 in FIG. 3.

The beam reverser module 60 comprises a mirror 62 having a highly reflecting surface 64.

The beam reverser module 60 further comprises a downstream beam deflecting element 66 and an upstream beam deflecting element 68. While it would be possible to provide separate optical elements for the downstream beam deflecting element 66 and the upstream beam deflecting element 68, in particular as separate prisms, in the present design the upstream beam deflecting element 68 and the downstream beam deflecting element 66 are together embodiment as a single monolithic optical element, in the present case as a single prism 70.

The upstream beam deflecting element 68 has an entrance surface 72 and an exit surface 74, and the downstream beam deflecting element 66 has an entrance surface 76 and an exit surface 78, wherein the exit surface 74 and the entrance surface 76 are formed by the same surface of the prism 70.

The upstream beam deflecting element 68 is a transmitting optical element, wherein the incoming laser beam 28 propagates through the upstream beam deflecting element 68 from the entrance surface 72 to the exit surface 74 without TIR.

The surfaces 72, 74, 76, 78 are coated with an anti-reflective coating in order to minimize reflection losses.

The incoming laser beam 28 is deflected by the upstream beam deflecting element 68 into the first direction according to the laser beam 28a. The laser beam 28a is reflected by the highly reflecting surface 64 into the second direction according to the laser beam 28b, which is then deflected into the third direction according to the laser beam 28c such that the laser beam 28c intersects the incoming laser beam 28.

The advantages of the beam reverser module 60 in term of reducing or even avoiding thermal lensing are comparable with the advantages of the beam reverser module 40.

Figure 5:
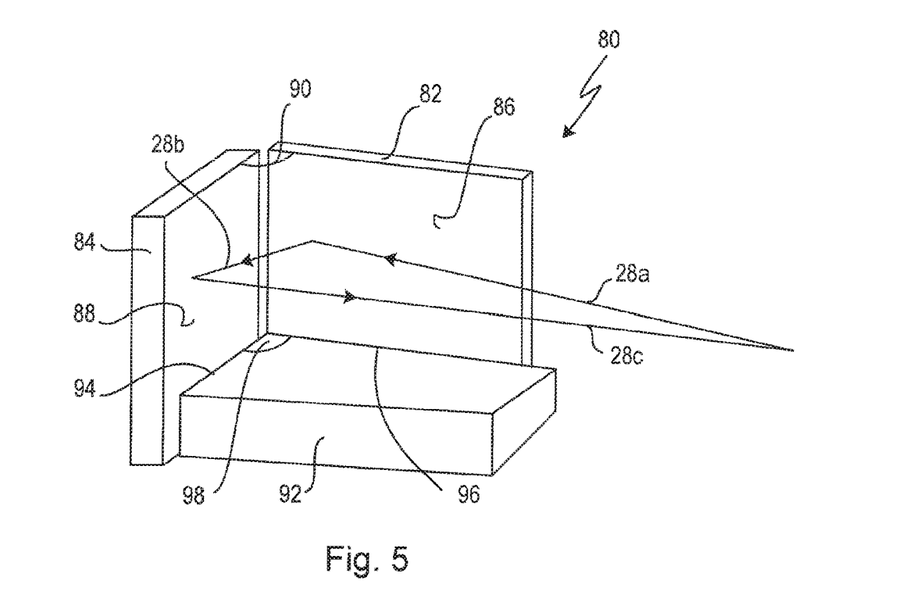
FIG. 5 shows a further embodiment of a beam reverser module for use in the optical power amplifier in FIG. 1 instead of the beam reverser module shown in FIG. 1.

FIG. 5 shows another embodiment of a beam reverser module 80 which differs from the beam reverser modules 40 and 60 in that the beam reverser module 80 comprises a first mirror 82 and a second mirror 84. The first mirror 82 has a highly reflecting surface 86, and the second mirror 84 has a highly reflective surface 88. The reflecting surfaces 86 and 88 replace the TIR surfaces 34 and 36 in the beam reverser module 12 in FIG. 1.

The incoming laser beam 28a is reflected at the reflecting surface 86 and directed to the reflecting surface 88 and leaves the beam reverser module 80 as the laser beam 28c.

The reflecting surface 86 and the reflecting surface 88 form an angle 90 with one another which is set such that the laser beam 28b reflected at the reflecting surface 88 intersects the incoming laser beam 28a.

In the specific embodiment, the mirrors 82 and 84 are optically bonded on a base plate 92 which defines the angle 90 by virtue of the fact that the base plate 92 is designed with two sides 94, 96 forming an angle 98 with one another which defines the angle 90.

The angle 90 is set in a range from about 85° to about 95°.

The mirrors 82 and 84 are arranged with respect to the incoming laser beam 28a such that the laser beam 28a impinges on the reflecting surface 86 at an angle of incidence in a range from about 40° to about 50°, preferably at an angle of incidence of about 45°. The laser beam 28b reflected at the reflecting surface 86 impinges on the reflecting surface 88 at an angle of incidence in a range from about 40° to about 50°, preferably at an angle of incidence of about 45°.

In the following, another embodiment of a beam reverser module will be described which is a modification of the known beam reverser prism 30 in FIG. 1.

Figure 6:
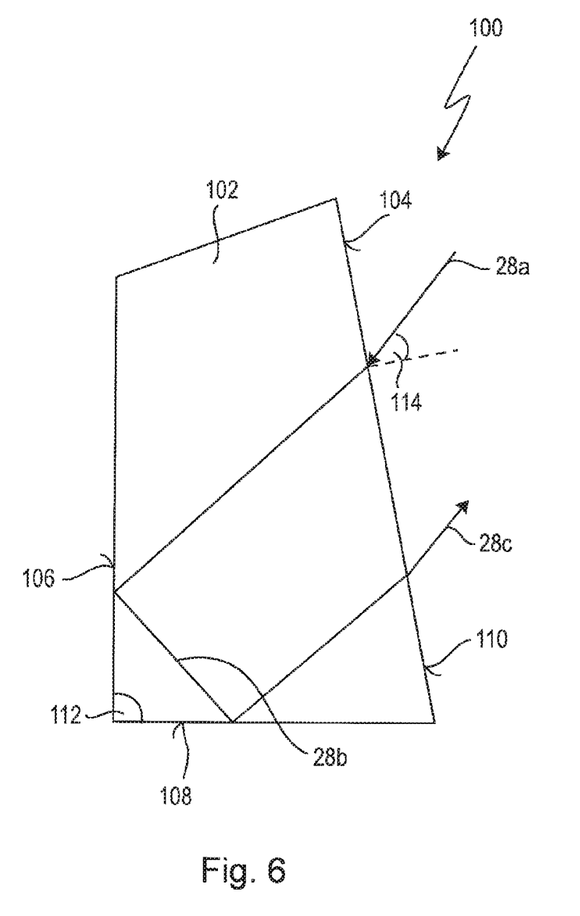
FIG. 6 shows the optical element in FIG. 2 for explaining modifications of the optical element in FIG. 2 for use in the optical power amplifier in FIG. 1 instead of the beam reverser module shown in FIG. 1.

FIG. 6 shows a beam reverser module 100 comprising a prism 102 as in the case of the beam reverser module 12 in FIG. 1.

The prism 102 has a laser beam entrance surface 104, a first TIR surface 106, a second TIR surface 108 and a laser beam exit surface 110 which coincides with the laser beam entrance surface 104.

The TIR surfaces 106 and 108 form an angle 112 greater than 60° with one another, wherein the angle 112 is about 90° in the embodiment shown in FIG. 6.

In order to decrease or avoid thermal lensing, the following measures are to be taken into account.

One measure is to arrange the entrance surface 104 with respect to the incoming laser beam 28a such that the angle of incidence 114 is greater than the Brewster angle whereby the beam width of the laser beam when propagating through the prism 102 is increased. An increased beam width within the prism 102 can reduce the thermal load on the TIR surfaces 106 and 108. The entrance surface 104 should be coated with an HLD (High Laser Durability) anti-reflective coating, because reflection of the p-polarized light at the entrance surface is no longer suppressed for angles of incidence larger than the Brewster angle.

Another measure to reduce TIR absorption at the TIR surfaces 106, 108 consists in changing the E-field conditions on the TIR surfaces 106, 108 by appropriate coatings which minimize the E-field on $CaF_2$.

A further measure to reduce thermal lensing is to use $CaF_2$ for the material of the prism 102 which has a linear laser induced absorption coefficient less than $0.2 \times 10^{-4}$ cm/mJ.

FIG. 7 shows again the optical element 100 in FIG. 6A purging device 134 is arranged to directly purge the optical element 100 with a purging medium, for example a purging gas 136, 138. The purging device 134 is adapted to purge the optical element 100 with a purge rate which is dependent on the position 140, 142 of the laser beam when impinging on the TIR-surfaces 106, 108 of the optical element 100. Arrows 146, 148 illustrate the local purge rate in dependence on the position of the laser beam. The purge rage is highest at the position 140, 142 of the laser beam and decreases on sites of the optical element 100 outside the position 140, 142 of the laser beam.

Figure 8:
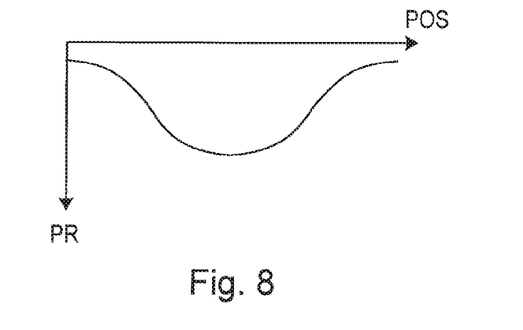
FIG. 8 shows a diagram illustrating the spatial dependency of the purge rate delivered by the purge device in FIG. 7.

FIG. 8 illustrates the dependency of the purge rate PR on the position POS on the optical element 100.

Figure 7:
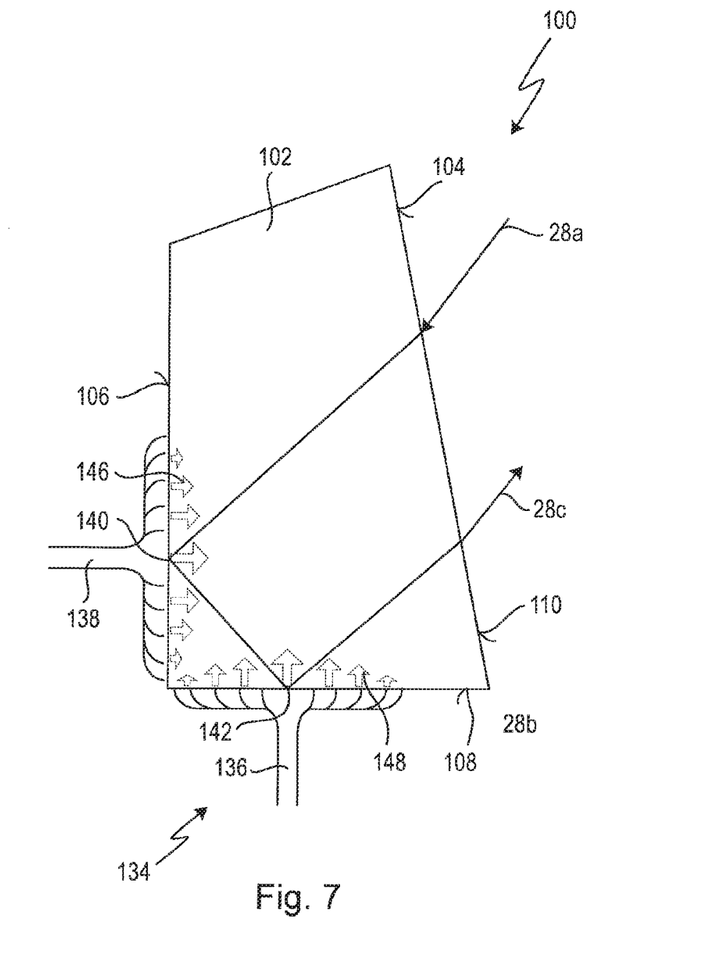
FIG. 7 shows a purge device for purging an optical element.

It is to be understood that the measures described with reference to FIGS. 7 and 8 for reducing or avoiding thermal lensing can be combined with the embodiments and measures described with respect to FIGS. 3 through 5.

The invention claimed is:

1. A module, comprising:
a prism comprising an entrance surface, a first total internal reflection surface, a second total internal reflection surface, and an exit surface; and
a purge device configured to directly purge the prism with a purge rate that varies over a surface of the prism in accordance with a position of the laser beam on or in the prism,
wherein the module is configured so that, during use of the module in an optical power amplifier of a laser arrangement:
a laser beam enters the prism via the entrance surface;
the first total internal reflection surface receives the laser beam entering the prism;
the second total internal reflection surface receives the laser beam reflected at the first total internal reflection surface;
the first and second internal reflection surfaces define an angle greater than 60° with one another;
after reflecting at the second internal reflection surface, the laser beam emerges from the prism via the exit surface; and
the entrance surface is configured so that an angle of incidence of the laser beam as it impinges on the entrance surface is greater than the Brewster angle.

2. The module of claim 1, wherein the first and second total internal reflection surfaces comprise protection coatings configured to change an electric field of the laser beam on these surfaces to reduce surface absorption of the laser beam.

3. The module of claim 1, wherein the prism comprises $CaF_2$ having a linear laser induced absorption coefficient of less than than $0.2 \times 10^{-4}$ cm/mJ.

4. The module of claim 1, wherein the first and second total internal reflection surfaces comprise protection coatings configured to change an electric field of the laser beam on these surfaces to reduce surface absorption of the laser beam, the prism comprises $CaF_2$ having a linear laser induced absorption coefficient of less than than $0.2 \times 10^{-4}$ cm/mJ.

5. The module of claim 1, wherein the entrance surface comprises a high laser durability anti-reflective coating.

6. The module of claim 5, wherein the exit surface comprises a high laser durability anti-reflective coating.

7. The module of claim 1, wherein the exit surface comprises a high laser durability anti-reflective coating.

8. The module of claim 1, wherein:
the first and second total internal reflection surfaces comprise protection coatings configured to change an electric field of the laser beam on these surfaces to reduce surface absorption of the laser beam; and
the entrance surface comprises a high laser durability anti-reflective coating.

9. The module of claim 8, wherein the exit surface comprises a high laser durability anti-reflective coating.

10. The module of claim 1, wherein:
the first and second total internal reflection surfaces comprise protection coatings configured to change an electric field of the laser beam on these surfaces to reduce surface absorption of the laser beam; and
the exit surface comprises a high laser durability anti-reflective coating.

11. The module of claim 1, wherein:
the prism comprises $CaF_2$ having a linear laser induced absorption coefficient of less than than $0.2 \times 10^{-4}$ cm/mJ; and
the entrance surface comprises a high laser durability anti-reflective coating.

12. The module of claim 11, wherein the exit surface comprises a high laser durability anti-reflective coating.

13. The module of claim 1, wherein:
the prism comprises $CaF_2$ having a linear laser induced absorption coefficient of less than than $0.2 \times 10^{-4}$ cm/mJ; and
the exit surface comprises a high laser durability anti-reflective coating.

14. The module of claim 1, wherein the purge device is configured to purge the first total internal reflection surface.

15. An amplifier, comprising:
a beam reverser module comprising a prism comprising an entrance surface, a first total internal reflection surface, a second total internal reflection surface, and an exit surface;
a purge device configured to directly purge the prism with a purge rate that varies over a surface of the prism in accordance with a position of the laser beam on or in the prism;
a power amplifier chamber; and
an optical unit,
wherein the module is configured so that, during use of the module in the amplifier:
a laser beam enters the prism via the entrance surface;
the first total internal reflection surface receives the laser beam entering the prism;
the second total internal reflection surface receives the laser beam reflected at the first total internal reflection surface;
the first and second internal reflection surfaces define an angle greater than 60° with one another;
after reflecting at the second internal reflection surface, the laser beam emerges from the prism via the exit surface; and
the entrance surface is configured so that an angle of incidence of the laser beam as it impinges on the entrance surface is greater than the Brewster angle.

16. The amplifier of claim 15, wherein the first and second total internal reflection surfaces comprise protection coatings configured to change an electric field of the laser beam on these surfaces to reduce surface absorption of the laser beam.

17. The amplifier of claim 15, wherein the prism comprises $CaF_2$ having a linear laser induced absorption coefficient of less than $0.2 \times 10^{-4}$ cm/mJ.

18. The amplifier of claim 15, wherein the purge device is configured to purge the first total internal reflection surface.

* * * * *

UNITED STATES PATENT AND TRADEMARK OFFICE
CERTIFICATE OF CORRECTION

PATENT NO. : 10,777,958 B2  
APPLICATION NO. : 15/830373  
DATED : September 15, 2020  
INVENTOR(S) : Michael Schall et al.

Page 1 of 1

It is certified that error appears in the above-identified patent and that said Letters Patent is hereby corrected as shown below:

In the Specification

Column 3, Line 21 (Approx.), delete "down stream" and insert -- downstream --;

Column 4, Line 54, delete "0.2×10'" and insert -- $0.2 \times 10^{-4}$ --;

Column 7, Line 8 (Approx.), delete "down-stream" and insert -- downstream --;

In the Claims

Column 9, Line 48 (Approx.), Claim 3, delete "than than" and insert -- than --;

Column 9, Line 54 (Approx.), Claim 4, delete "than than" and insert -- than --;

Column 10, Line 14 (Approx.), Claim 11, delete "than than" and insert -- than --;

Column 10, Line 22 (Approx.), Claim 13, delete "than than" and insert -- than --.

Signed and Sealed this  
Tenth Day of November, 2020

Andrei Iancu  
*Director of the United States Patent and Trademark Office*